(12) United States Patent
Yegorin

(10) Patent No.: US 11,941,453 B2
(45) Date of Patent: Mar. 26, 2024

(54) CONTAINERIZED COMPUTING ENVIRONMENTS

(71) Applicant: INTERNATIONAL BUSINESS MACHINES CORPORATION, Armonk, NY (US)

(72) Inventor: Anton Yegorin, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 17/115,090

(22) Filed: Dec. 8, 2020

(65) Prior Publication Data
US 2022/0179715 A1 Jun. 9, 2022

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/4557* (2013.01)

(58) Field of Classification Search
CPC ............... G06F 9/5077; G06F 9/45558; G06F 2009/4557
See application file for complete search history.

(56) References Cited

U.S. PATENT DOCUMENTS

| 10,528,337 B1 | 1/2020 | Varadharajan Kannan |
| 2014/0304398 A1 | 10/2014 | Carlen et al. |
| 2018/0203736 A1* | 7/2018 | Vyas ................... G06F 9/45558 |
| 2018/0276215 A1 | 9/2018 | Chiba et al. |
| 2018/0365055 A1 | 12/2018 | Bhimani et al. |
| 2021/0232345 A1* | 7/2021 | Corrie ................. G06F 9/45558 |

FOREIGN PATENT DOCUMENTS

| CN | 109710376 A | 5/2019 |
| WO | 2016077367 A1 | 5/2016 |

OTHER PUBLICATIONS

Mell et al., "The NIST Definition of Cloud Computing", Recommendations of the National Institute of Standards and Technology, NIST Special Publication 800-145, Sep. 2011, 7 pages.
Kubernetes, "Kubernetes Scheduler", printed Dec. 8, 2020, 2 pages, https://kubernetes.io/docs/concepts/scheduling/kube-scheduler/#scoring.

* cited by examiner

*Primary Examiner* — Jacob D Dascomb
(74) *Attorney, Agent, or Firm* — Teddi E. Maranzano

(57) ABSTRACT

The scheduling or allocation of images to nodes of a containerized computing environment is provided. Images that share layers (i.e. images that have one or more layers in common) are allocated to the same node. To determine whether different images share one or more layers, leveraging metadata that is associated with the images is provided. By analyzing metadata associated with the images, it may be determined if the images have one or more layers in common (i.e. comprise the same layer(s)). In this way, information that is already available with conventional images may be used.

17 Claims, 7 Drawing Sheets

CONTAINERIZED COMPUTING ENVIRONMENTS

BACKGROUND

The present invention relates generally to computing environments, and more particularly to methods for containerized computing environments.

Operating-system-level virtualization has become widely used in cloud computing and platform as a service (PaaS) frameworks. Operating-system-level virtualization is a server-virtualization method where the operating system kernel allows multiple isolated user space instances called containers. On the LINUX® operating system, with support from kernel namespaces and the control groups (cgroups) mechanism, emerging container solutions such as Docker and LXC have been attracting more and more attention and are currently in rapid development.

Compared with a traditional virtual machine, a container uses a smaller image size, launches faster, and costs less resources (e.g., memory, processing clock cycles), thus making the container a lightweight and fast virtualization solution. A container is a running instance of an image. Such images are typically structured as a chain of layers. Each new modification is represented as a new layer, added on top of its parent (base) layer.

Container orchestration systems are used in attempts to optimize and speed-up scheduling and execution of containers. Typically, such container orchestration systems employ scheduling engines that employ one or more scoring algorithms for container scheduling. By way of example, for a service under consideration, one example of a scoring algorithm is configured to favor nodes (i.e. hosts) that already have images for the service stored in memory (e.g. cached locally).

SUMMARY

The present invention seeks to provide allocating images to nodes of a containerized computing environment that may enable improved scheduling and/or execution of containers. Embodiments of the present invention may take account of cross-image layer identity to leverage resource savings and reducing intra-cluster traffic.

According to an aspect of the present invention there is provided a computer-implemented method of processing a command for allocating images to nodes of a containerized computing environment. The method comprises obtaining metadata associated with a plurality of images, metadata associated with an image comprising information indicating the layers of that image. The method also comprises analyzing the obtained metadata to identify images of the plurality of images that share one or more layers. The identified images are the allocated to the same, target node of a containerized computing environment.

Embodiments of the present invention may be employed in combination with conventional/existing container orchestration systems and services, such as a Kubernetes™ scheduling service for example. In this way, embodiments may integrate into legacy systems so as to improve and/or extend their functionality and capabilities. An improved (e.g. faster and/or more efficient) containerized computing environment may therefore be provided by proposed embodiments.

According to another embodiment of the present invention, there is provided a computer program product for allocating images to nodes of a containerized computing environment, the computer program product comprising a computer readable storage medium having program instructions embodied therewith, the program instructions executable by a processing unit to cause the processing unit to perform a method according to one or more proposed embodiments when executed on at least one processor of a data processing system.

According to yet another aspect, there is provided a processing system comprising at least one processor and the computer program product according to one or more embodiments, wherein the at least one processor is adapted to execute the computer program code of said computer program product.

According to further aspect, there is provided a system for allocating images to nodes of a containerized computing environment. The system comprises an interface configured to obtain metadata associated with a plurality of images, metadata associated with an image comprising information indicating the layers of that image. The system also comprises an analysis component configured to analyze the obtained metadata to identify images of the plurality of images that share one or more layers. The system also comprises a controller configured to allocate the identified images to the same, target node of a containerized computing environment.

The system may be adapted to take account of cross-image layer replication/sharing so as to provide improved allocation of images to nodes of a containerized computing environment. For example, a proposed system may allocate images with identical layers to the same node reducing, thus potentially reducing intra-cluster traffic, saving disk space and/or speeding up image download and startup time.

A proposed system may be incorporated into an existing/conventional image scheduling system. Thus, there may be proposed a container scheduling system which evaluates the metadata associated with a plurality of images to identify images which share one or more layers. The system may group identified images that share layers and allocate the grouped images to the same node. This may, for example, reduce traffic between nodes of the containerized computing environment.

BRIEF DESCRIPTION OF THE DRAWINGS

Preferred embodiments of the present invention will now be described, by way of example only, with reference to the following drawings, in which.

DETAILED DESCRIPTION

Figure 1:
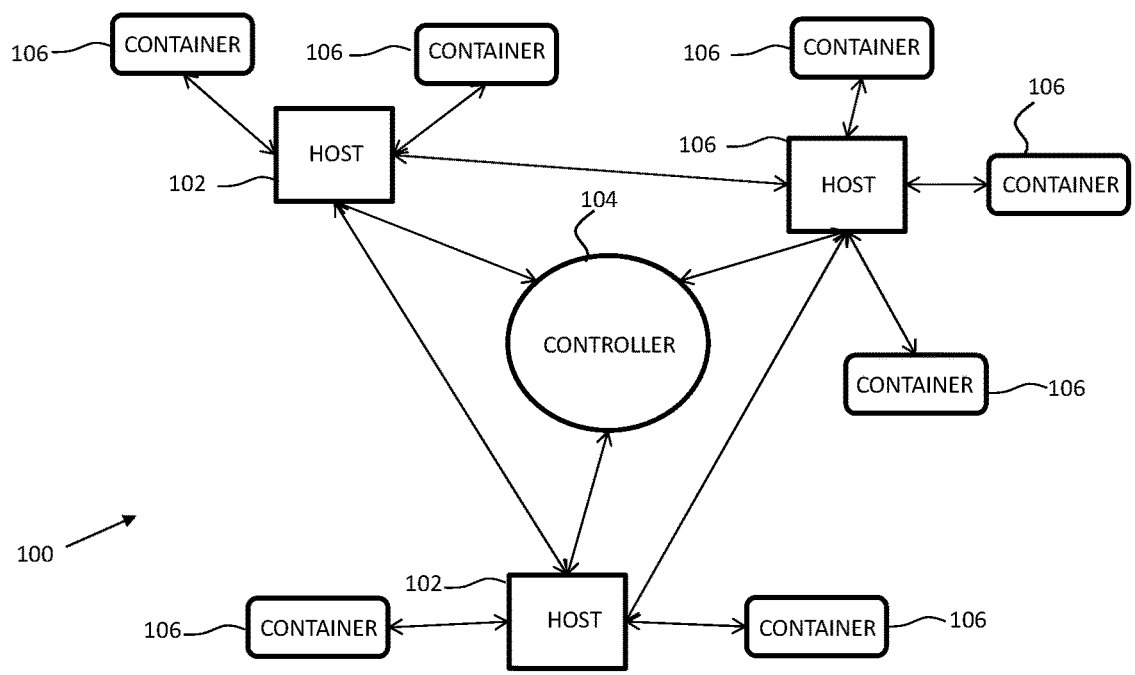
FIG. 1 illustrates a container hosting environment in accordance with which one or more embodiments of the invention are implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above in the Background section, containers have become the virtualization choice over traditional virtual machines for hosting application programs (applications) in cloud computing environments. However, the existing container file system implementation still faces various challenges, including orchestration and scheduling of images across nodes of a containerized computing environment.

To address the above and other challenges, illustrative embodiments of the invention provide embodiments for improving the scheduling or allocation of images to nodes of a containerized computing environment. Such embodiments may reduce intra-cluster traffic, save disk space, and/or speed up container download and startup time. By way of example, a proposed embodiment is to allocate images that share layers (i.e. images that have one or more layers in common) to the same node. For instance, three images each having the same layer (e.g. "Layer A1") may be grouped together and scheduled for execution on the same target node (e.g. Node 1).

Reference to an "image" should be taken to refer to a file-like entity which may be thought as being like a static file of which a container is a running instance. An image is typically structured as a chain of layers. Since a container is a running instance of a container, an image may otherwise be referred to as a 'container image', thus indicating that the image facilitates the creation of a container.

To determine whether different images share one or more layers, embodiments propose to leverage metadata that is associated with the images. For instance, by analyzing metadata associated with the images, it may be determined if the images have one or more layers in common (i.e. comprise the same layer(s)). In this way, proposed embodiments may make use of information that is already available with conventional images.

Before describing illustrative embodiments, an overview of a container system with which illustrative embodiments can be implemented will be given.

In order to achieve portability and reusability, a container makes use of a union mount mechanism to construct and combine different layers for file sharing, instead of using an entire disk image file as a traditional virtual machine does. Specifically, after container initialization, the container union mounts base layers (read-only) and a top layer (read-write) together to build a root file system. During the container's lifecycle, all modifications to the root file system are written on the top layer in an incremental way. The commit operation causes the container to save the current top layer and to start to write on a new layer over the saved top layer, thus creating a new top layer.

As shown in FIG. 1, a container cluster 100 (e.g., Docker Swarm, Magnum and Kubernetes) comprises hosts 102 and a cluster controller 104. In a cloud computing platform, a cluster of host devices (hosts) that use containers to host applications, such as shown in FIG. 1, is called a "container hosting environment." Hosts 102 create and run containers 106, and connect to each other via a high-speed network (represented by the interconnecting arrows in FIG. 1). As mentioned, in illustrative embodiments, a host 102 creates one or more containers 106 to respectively execute one or more containerized stateful applications (i.e., an application that executes in a container and keeps track of former (previous) container execution states). Cluster controller 104 is responsible for managing container hosts 102. For example, cluster controller 104 monitors container status and launches high availability (HA) processes. The cluster controller 104 also executes user commands, such as commands that cause container migration between hosts and that start backup and recovery operations.

A running (executing) container is launched from its image. Before a container is launched, the host needs to obtain the corresponding image from a container registry. In a Docker container implementation, an image is structured as a chain of layers. Each new modification is represented as a new layer, added on top of its parent (base) layer.

Illustrative embodiments that may provide for improved images allocation or scheduling will now be described.

In accordance with illustrative embodiments, a container scheduling/orchestration engine is configured identify images that share one or more layers and then allocate the identified images to the same node.

Proposed is allocating images to nodes of a containerized computing environment. This may allow images with shared or identical layers to be scheduled on the same node. In this way, intra-cluster traffic may me reduced and disk space may be saved. For example, proposed embodiments may analyze metadata associated with a plurality of images to identify images that share one or more layers.

Grouping and allocating images to nodes based on layer structure is thus proposed. By way of example, embodiments may be thought of as leveraging layers for scheduling in cloud-based orchestration engines.

An exemplary embodiment may provide a method for allocating images to nodes of a containerized computing environment. In such an exemplary method, metadata associated with a plurality of images is obtained, wherein metadata associated with an image comprises information indicating the layers of that image. The obtained metadata is analyzed to identify images of the plurality of images that share one or more layers. The identified images are then allocated to the same, target node of the containerized computing environment.

For example, allocating the identified images to the same target node may comprise: analyzing the workload of each node of the containerized computing environment to determine if a node is already allocated an image comprising at least one of the one or more layers shared by the identified images; and responsive to determining a node is already allocated an image comprising at least one of the one or more layers shared by the identified images, defining the node as the target node to which the identified images are to be allocated. In this way, container images with shared layers may be grouped together and scheduled on the same node, leading to higher download speed and startup performance.

Also, allocating the identified images to the same target node may further comprise: responsive to determining no node is already allocated an image comprising at least one of the one or more layers shared by the identified images: analyzing the workload of each node of the containerized computing environment to identify an empty node; and, responsive to identifying an empty node, defining the identified empty node as the target node to which the identified images are to be allocated. In this way, images with identical layers may be grouped together for scheduling onto empty nodes the same (if it is determined that the images do not have conflicts for example).

In some embodiments, obtaining metadata associated with a plurality of images may comprise extracting metadata from the plurality of images. Embodiments may therefore leverage existing metadata already available with images. Such metadata may be a conventional/typical feature of an image build system, and so embodiments may have the benefit that they can make use of existing/available information.

Nonetheless, some embodiments may be configured to extend or generate metadata (e.g. when metadata is not available or does not comprise layer information). For example, obtaining metadata associated with a plurality of images may comprise: for each of the plurality of images: analyzing the image to identify the layers of the image; generating metadata comprising information indicating the identified layers of the image; and associating the metadata with the image.

Another exemplary embodiment may provide a container image orchestration method for a containerized computing environment comprising a plurality of nodes. In such an exemplary embodiment, a plurality of images for execution in the containerized computing environment is obtained. The plurality of images are then allocated to nodes of the containerized computing environment according to proposed embodiments.

By way of further description of the embodiment(s) of the present invention, a container image scheduling system will now be considered. The scheduling system implements nodes scoring in order to determine suitable host nodes to place workloads on (i.e. allocate images to). This scoring method sits in the scoring phase (not the filtering stage), which is a typical stage for container scheduling systems (such as Kubernetes, for example).

Each image has a metadata associated with it. This metadata may comprise reference(s) to other workloads that have identical layers used. Alternatively, the metadata can be provided by a central system that holds all workload data (a docker registry extension, for instance), or it can comprise packaging tools meta descriptors (like helm, for example).

During scheduling of a new image, its associated metadata is extracted and examined to determine a list of other image it shares layers with.

Nodes which are already running (or about to run) images with shared layers are scored higher (i.e. boosted).

Identified images with shared layers are grouped together and scheduled on the same node.

Layers can be already available on the target nodes. In this case they also can be included into scoring.

For completely empty nodes, images with identical layers are grouped together for scheduling onto the same mode (if they do not have conflicts).

Figure 2:
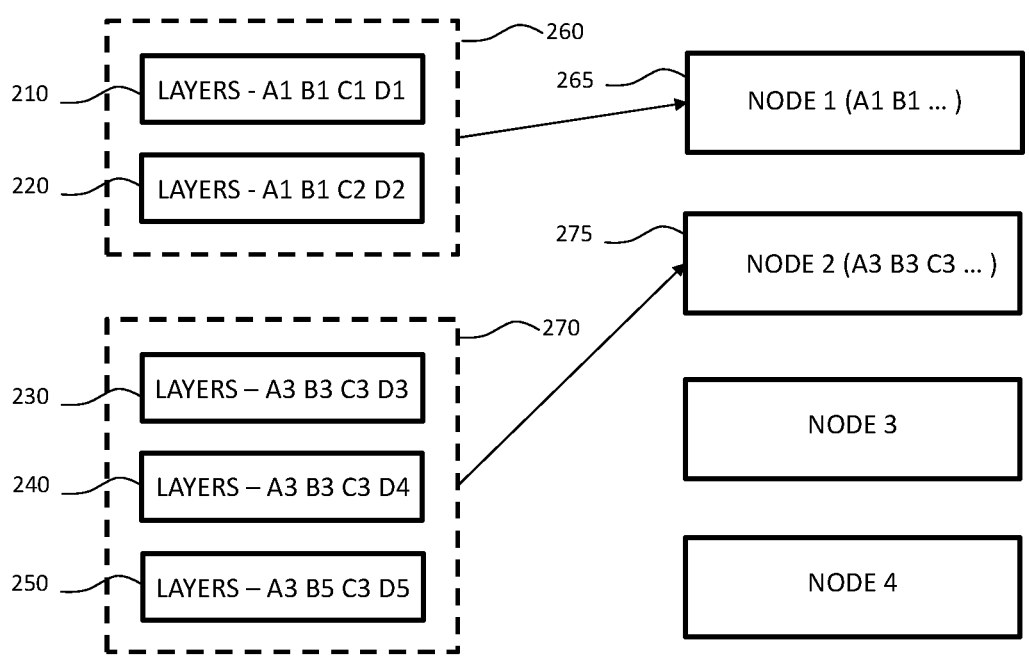
FIG. 2 illustrate an example of allocating images to nodes of a containerized computing environment according to a proposed embodiment.

By way of further demonstration an example of a proposed approach to allocating images to nodes of a containerized computing environment is illustrated in FIG. 2.

In this example, first 210 to fifth 250 images are provided. Analysis of the metadata associated with the first 210 to fifth 250 images indicates the following:

The first image 210 comprises four layers, namely layers A1, B1, C1 D1;

The second image 220 comprises four layers, namely layers A1, B1, C2 D2;

The third image 230 comprises four layers, namely layers A3, B3, C3 D3;

The fourth image 240 comprises four layers, namely layers A3, B3, C3 D4 and

The fifth image 250 comprises four layers, namely layers A3, B3, C3 D5.

Based on this information about the layers of each image, it is determined that:

The first 210 and second 220 images share layers A1 and B1; and

The third 230, fourth 240 and fifth 250 images share layers A3, B3 and C3.

According to proposed embodiments, the first 210 and second 220 images (which share layers A1 and B1) are grouped together (into a first group 260) and allocated to a first node "Node 1" 265 of the containerized computing environment. Further, the third 230, fourth 240 and fifth 250 images (which share layers A3, B3 and C3) are grouped together (into a second group 270) and allocated to a second node "Node 2" 275 of the containerized computing environment.

Thus, from the description above, it will be appreciated that images which share one or more layers are allocated same target node of a containerized computing environment. Embodiments may be thought of as grouping images which have one or more layers in common, and such grouping may be achieved by analysis of metadata associated with the images.

Figure 3:
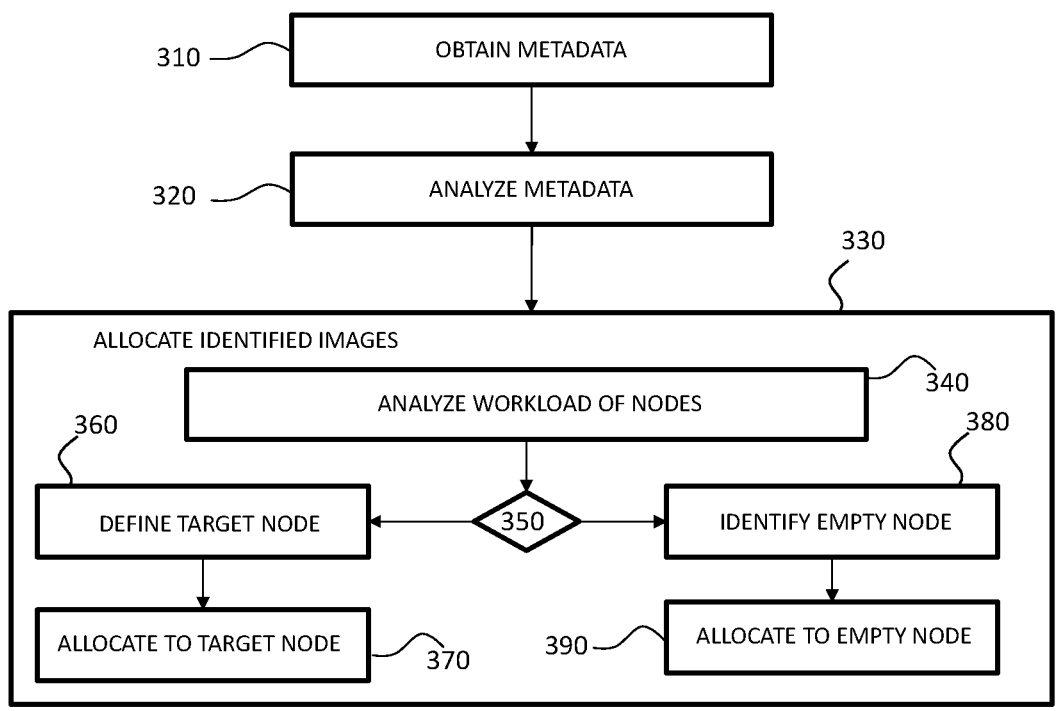
FIG. 3 depicts a flow diagram of a method according to a proposed embodiment.

Referring now to FIG. 3, there is depicted a flow diagram of a method according to a proposed embodiment.

The method is for allocating images to nodes of a containerized computing environment.

Step 310 comprises obtaining metadata associated with a plurality of images. Here, the metadata is already available as a standard feature, and so it is simply extracted from the plurality of images. Metadata associated with an image comprises information indicating the layers of that image.

In step 320, the obtained metadata is analyzed to identify images of the plurality of images that share one or more layers.

In step 330, the identified images that share one or more layers are allocated to the same, target node of the containerized computing environment. In more detail, the step 330 of allocating the identified images to the same, target node comprises multiple sub-steps 340-390.

In step 340, the workload of each node of the containerized computing environment is analyzed to determine if a node is already allocated an image comprising at least one of the one or more layers shared by the identified images. Step 350 comprises checking if such a node has been determined in step 340.

Responsive to determining a node is already allocated an image comprising at least one of the one or more layers shared by the identified images, the method proceeds to step 360 in which the node is defined as the target node to which the identified images are to be allocated. Following step 360, the identified images are allocated to the target node in step 370.

Conversely, responsive to determining no node is already allocated an image comprising at least one of the one or more layers shared by the identified images, the method proceeds to step 380, in which the workload of each node of the containerized computing environment is analyzed to identify an empty node. In step 390, the identified images are allocated to the identified empty node.

Figure 4:
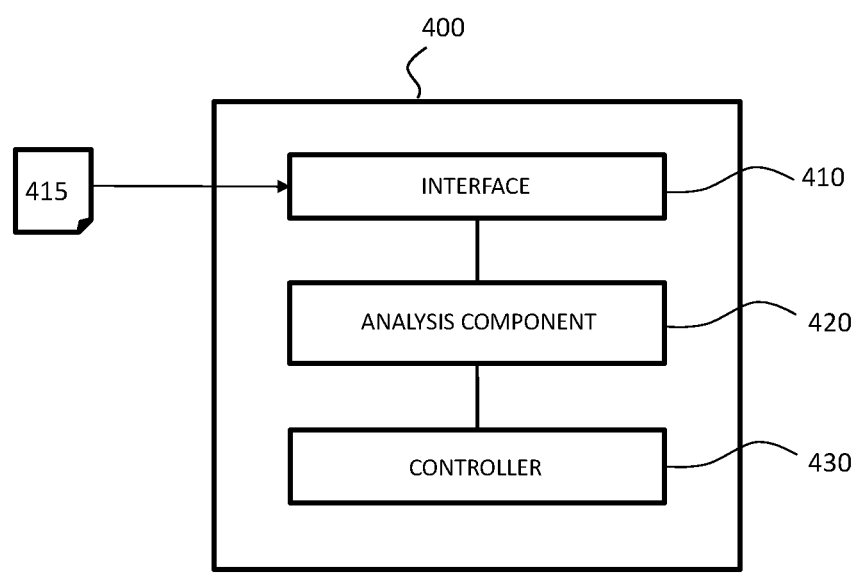
FIG. 4 depicts a simplified block diagram of a system according to a proposed embodiment.

Referring now to FIG. 4, there is depicted a simplified block diagram of a system 400 according to an embodiment. The system 400 depicted in FIG. 4 is for allocating images to nodes of a containerized computing environment. The system comprises an interface 410, an analysis component 420 and a controller 430.

The interface 410 is configured to obtain metadata 415 associated with a plurality of images, wherein metadata associated with an image comprises information indicating the layers of that image.

The analysis component 420 is configured to analyze the obtained metadata to identify images of the plurality of images that share one or more layers.

The controller 430 is configured to allocate the identified images to the same, target node of a containerized computing environment. Specifically, the controller 430 of this embodiment is configured to analyze the workload of each node of the containerized computing environment to determine if a node is already allocated an image comprising at least one of the one or more layers shared by the identified images. Responsive to determining a node is already allocated an image comprising at least one of the one or more layers shared by the identified images, the controller 430 defines the node as the target node to which the identified images are to be allocated.

It will be understood that, as a result of analyzing metadata associated with a plurality of images, the system 400 allocates the images to nodes of a containerized computing environment, wherein images which share one or more layers are allocated same, target node.

Thus, from the above description, it will be appreciated that proposed methods and systems provide for grouped allocation of images that share one or more layers. Based on allocating images which share one or more layers to the same node, various benefits may be realized (such as reduced intra-cluster traffic, reduced storage space requirement, and/or reduced container download and startup time).

As will be apparent from the above description, all or part of a system according to a proposed embodiment provided by a cloud-computing system. Also, a system for processing commands for building an image may be provided or implemented in a hybrid cloud-computing system.

With reference to the following description made with regard to a cloud computing system, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. The following description of a cloud computing system and environment is made purely for the purposes of explanation and understanding.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This off-premises cloud model may include at least five characteristics, at least three service models, and at least four deployment models.

Characteristics are as follows: On-demand self-service: a cloud consumer can unilaterally provide computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

Figure 5:
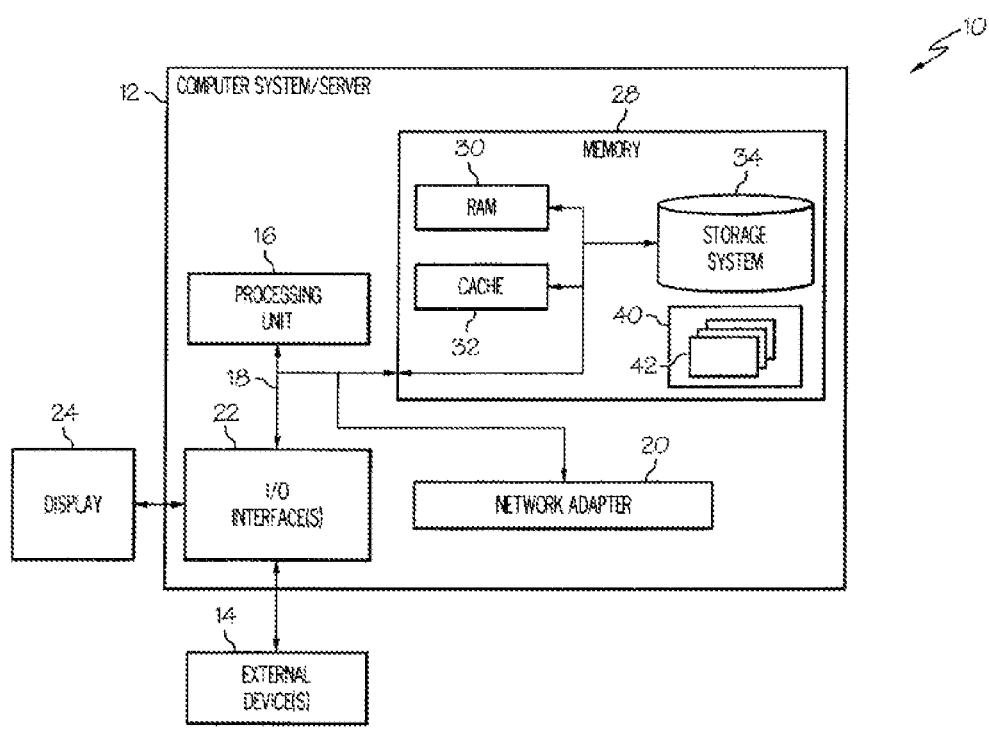
FIG. 5 illustrates a cloud system node.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
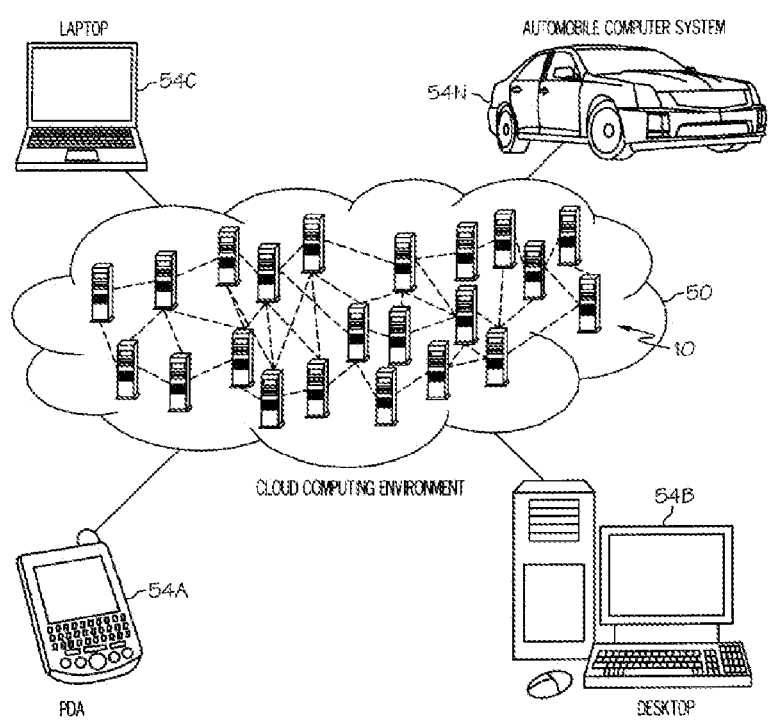
FIG. 6 illustrates a cloud computing environment according to an embodiment.

Referring now to FIG. 6, illustrative cloud computing environment or cloud computing system 50 is depicted. This can, in embodiments, be equated to the cloud computing system as depicted in FIG. 1 for example. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
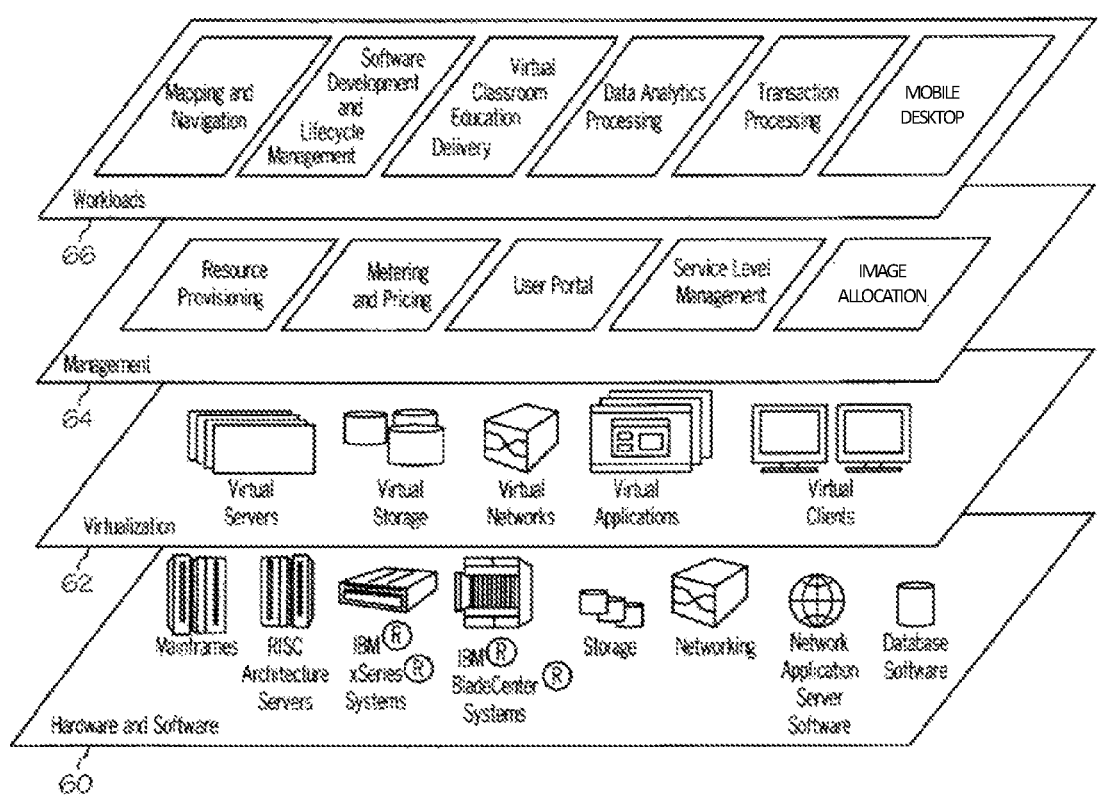
FIG. 7 illustrates cloud abstraction mode layers according to an embodiment.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Image allocation provides for image allocation according to proposed embodiments as detailed above.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for allocating images to nodes of a containerized computing environment, the method comprising:

obtaining metadata associated with a plurality of images, wherein metadata associated with an image comprises information indicating layers of that image;

analyzing the obtained metadata to identify images of the plurality of images that share one or more layers; and allocating the identified images to the same, target node of a containerized computing environment, wherein the allocating further comprises responsive to determining no node is already allocated the image comprising at least one of the one or more layers shared by the identified images:

analyzing a workload of each node of the containerized computing environment to identify an empty node; and responsive to identifying the empty node, defining the identified empty node as the target node to which the identified images are to be allocated.

2. The method of claim 1, wherein allocating the identified images to the same, target node further comprises:

analyzing the workload of each node of the containerized computing environment to determine if the node is already allocated the image comprising at least one of the one or more layers shared by the identified images; and responsive to determining the node is already allocated the image comprising at least one of the one or more layers shared by the identified images, defining the node as the target node to which the identified images are to be allocated.

3. The method of claim 1, wherein obtaining metadata associated with a plurality of images comprises extracting metadata from the plurality of images.

4. The method of claim 1, wherein obtaining metadata associated with a plurality of images comprises:

for each of the plurality of images: analyzing the image to identify the layers of the image; generating metadata comprising information indicating the identified layers of the image; and associating the metadata with the image.

5. The method of claim 1, wherein the allocating the images is performed by an orchestration service or system.

6. A computer program product for allocating images to nodes of a containerized computing environment, the computer program product comprising a computer readable storage medium having program instructions embodied therewith, the program instructions executable by a processing unit to cause the processing unit to perform a method comprising:

obtaining metadata associated with a plurality of images, wherein metadata associated with an image comprises information indicating layers of that image;

analyzing the obtained metadata to identify images of the plurality of images that share one or more layers; and allocating the identified images to the same, target node of a containerized computing environment, wherein the allocating comprises responsive to determining no node is already allocated an image comprising at least one of the one or more layers shared by the identified images:

analyzing a workload of each node of the containerized computing environment to identify an empty node; and responsive to identifying the empty node, defining the identified empty node as the target node to which the identified images are to be allocated.

7. The computer program product of claim 6, wherein allocating the identified images to the same, target node further comprises:
- analyzing the workload of each node of the containerized computing environment to determine if the node is already allocated an image comprising at least one of the one or more layers shared by the identified images; and
- responsive to determining the node is already allocated the image comprising at least one of the one or more layers shared by the identified images, defining the node as the target node to which the identified images are to be allocated.

8. The computer program product of claim 6, wherein obtaining metadata associated with a plurality of images comprises extracting metadata from the plurality of images.

9. The computer program product of claim 6, wherein obtaining metadata associated with a plurality of images comprises:
- for each of the plurality of images: analyzing the image to identify the layers of the image; generating metadata comprising information indicating the identified layers of the image; and associating the metadata with the image.

10. The computer program product of claim 6, wherein the allocating the images is performed by an orchestration service or system.

11. The computer program product of claim 6, further comprising:
- an interface that receives metadata associated with a plurality of images, wherein metadata associated with an image comprises information indicating the layers of that image;
- an analysis component that analyzes the obtained metadata to identify images of the plurality of images that share one or more layers; and
- a controller that allocates the identified images to the same, target node of a containerized computing environment.

12. A computer system for allocating images to nodes of a containerized computing environment, comprising:
- one or more processors;
- a memory coupled to at least one of the processors;
- a set of computer program instructions stored in the memory and executed by at least one of the processors in order to perform actions of:
  - obtaining metadata associated with a plurality of images, wherein metadata associated with an image comprises information indicating the layers of that image;
  - analyzing the obtained metadata to identify images of the plurality of images that share one or more layers; and
  - allocating the identified images to the same, target node of a containerized computing environment, wherein the allocating comprises responsive to determining no node is already allocated an image comprising at least one of the one or more layers shared by the identified images:
    - analyzing a workload of each node of the containerized computing environment to identify an empty node; and
    - responsive to identifying the empty node, defining the identified empty node as the target node to which the identified images are to be allocated.

13. The computer system of claim 12, wherein allocating the identified images to the same, target node further comprises:
- analyzing the workload of each node of the containerized computing environment to determine if the node is already allocated an image comprising at least one of the one or more layers shared by the identified images; and
- responsive to determining the node is already allocated an image comprising at least one of the one or more layers shared by the identified images, defining the node as the target node to which the identified images are to be allocated.

14. The computer system of claim 12, wherein obtaining metadata associated with a plurality of images comprises extracting metadata from the plurality of images.

15. The computer system of claim 12, wherein obtaining metadata associated with a plurality of images comprises:
- for each of the plurality of images: analyzing the image to identify the layers of the image; generating metadata comprising information indicating the identified layers of the image;
- and associating the metadata with the image.

16. The computer system of claim 12, wherein the allocating the images is performed by an orchestration service or system.

17. The computer system of claim 12, further comprising:
- an interface that receives metadata associated with a plurality of images, wherein metadata associated with an image comprises information indicating the layers of that image;
- an analysis component that analyzes the obtained metadata to identify images of the plurality of images that share one or more layers; and
- a controller that allocates the identified images to the same, target node of a containerized computing environment.

* * * * *